US United States Patent Office 2,856,410
Patented Oct. 14, 1958

2,856,410

N-TRICHLOROMETHYLTHIO DERIVATIVES

Allen R. Kittleson, Cranford, and Joseph F. Nelson, Westfield, N. J., assignors to Esso Research and Engineering Company, a corporation of Delaware No Drawing. Application June 28, 1955
Serial No. 518,686

7 Claims. (Cl. 260—306.7)

This invention relates to improvements in the preparation of the nitrogen derivatives in the reaction of nitrogen compounds, such as imides or amides, with perchloromethyl mercaptan. It is concerned more particularly with carrying out the reaction in a suitable inert organic solvent and in the presence of an admixed amine which is capable of aiding the reaction in a desired manner, and which is preferably a tertiary amine.

The N-trichloromethylthio derivatives of concern herewith are characterized by compounds in which the >NSCCl$_3$ group is linked to carbon or sulfur in an acyl group or similar type of group. These compounds have been found to be effective as fungicides, insecticides and germicides. Their compositions and uses are described in more detail in patents like the following: U. S. Patents 2,553,770 and U. S. 2,553,775.

N-trichloromethylthio imides, amides, etc., have been conveniently prepared (see U. S. 2,553,771) by dissolving the imide, amide, hydrantoin, or 2,4 oxazolidinedione in water containing an equal molar quantity of alkali hydroxide such as sodium hydroxide. While stirring rapidly an equal molar quantity of perchloromethyl mercaptan is added. The N-trichloromethylthio derivative separates out and is separated by filtration if a solid or extraction by an organic solvent if a liquid.

The above procedure in some respects has several disadvantages:

(1) If the derivative is a solid, a certain proportion of the water insoluble perchloromethyl mercaptan is occluded in or adsorbed on the solid precipitate. This mercaptan in the presence of a small quantity of moisture, slowly decomposes giving off acid vapors causing severe corrosion of metal container and deterioration of paper bags in storage. Also in applying these compounds as fungicidal agents to foliage or on seeds the impurities show phytotoxic effects. (2) If the derivative is a liquid some of the perchloromethyl mercaptan is dissolved in the usually viscous oil and is thereby unable to react with the water soluble sodium imide reactant, then the resulting yields of desired product are low and the final oily liquid derivative is badly contaminated with unreacted perchloromethyl mercaptan which is very difficult to remove.

Now it has been found, in accordance with the present invention, that many of the >NSCCl$_3$ derivative compounds can be prepared advantageously in an anhydrous medium using an inert organic solvent as reaction medium and an organic basic compound such as trialkyl amine to take up HCl formed in the reaction.

The solvent may be a ketone, aromatic or aliphatic hydrocarbon, a chlorinated hydrocarbon or the like. Chloroform is used preferably, since the amine hydrochloride is soluble in this solvent and does not form a voluminous precipitate as when using most other solvents. Also, CHCl$_3$ is low boiling and readily removed from the product if the latter is an oily liquid.

The inert organic solvents generally found suitable for dissolving the imide or amide type reactant are compounds which can be volatilized or boiled at temperatures below 100° C. under moderate pressures or subatmospheric pressures. This volatility characteristic of the solvent is desirable to permit removal of the solvent without decomposition of the desired product. Ketones, such as acetone or methyl ethyl ketone, may be employed. Other oxygen-containing solvents, such as diethyl ether, may be used. Benzene, toluene, xylene and naphthenes, such as methyl cyclopentane, are examples of aromatic and naphthenic hydrocarbon solvents which may be used. Hexane and heptane are suitable aliphatic hydrocarbon solvents. Other chlorinated hydrocarbon solvents are tetrachlorethane and carbon tetrachloride. Small amounts of water may be present, but, in general, the solvent is kept substantially free of water in the reaction.

The amine may be any trialkyl amine, however, trimethyl or triethyl amine are preferred since they are most readily removed from the product by water washing. The amine may easily be recovered from the wash water by addition of an alkali hydroxide.

The kind of amine suitable for the purpose of the present invention is, in general, one in which the nitrogen is linked only to carbon, i. e. 3 valence bonds from the nitrogen to carbon as in trialkyl amines, dimethyl aniline, pyridine, or similar compounds. Such amines are capable of combining with hydrogen chloride formed in the reaction of the perchloromercaptan with the amide, imide, or the like. The amine hydrochloride compounds can then be removed from the reaction product. Although most of the amine hydrochlorides are soluble in chloroform, the lower molecular weight ones such as trimethyl or triethyl amine hydrochlorides are readily washed out with water. The amine hydrochlorides are generally insoluble in other solvents, in which case they may be advantageously removed by filtration.

The proportion of amine to be used in the reaction is, in general, an equimolar amount with respect to the amide, imide or nitrogen-containing derivative which is reacted with the perchloromethyl mercaptan. In other words, a sufficient amount of the amine is admixed or present in the reaction mixture to combine with or absorb the hydrogen chloride formed by the reaction. A small excess of the amine may be present, but it is desirable not to have too large an excess of the amine present, for the excess of the amine tends to compete for reaction with the perchloromethyl mercaptan and thus lowers the desired yield of the N-trichloromethylthio derivative formed from the imide, amide or the like.

Since the many types of N-trichloromethylthio derivatives having parasiticidal properties have been well disclosed in the art, e. g. U. S. 2,553,770, for purposes of brevity and simplicity this term or description of the products will be used herein to include imides, amides and other related nitrogen-containing compounds as well as other desired derivatives. The starting compounds used for preparing these various derivatives will herein be broadly or generically described as amides for reasons pointed out in U. S. 2,553,775.

After reaction of the amide or imide with perchloromethyl mercaptan is complete a small excess (5–15 mole percent) of amine may be added. This excess amine will react with any unreacted mercaptan and this reaction product, being water soluble will be washed out in a subsequent water washing step and thereby be eliminated from the desired product.

EXAMPLE 1

*Preparation of N-trichloromethylthio tetrahydrophthalimide*

One mole (151 g.) of tetrahydrophthalimide and one mole (101 g.) of triethyl amine were dissolved in 800 ml. of chloroform in a two-liter, three-neck flask equipped with a stirrer, condenser, dropping funnel, thermometer and cooling bath. While stirring at a temperature of 20°–23° C. 186 g. (1 mole) of perchloromethyl mercaptan dissolved in 200 ml. of chloroform was added from the dropping funnel over a period of 15 minutes. The reaction mixture was stirred for additional 20 minutes and then cooled to 10° C. The product N-trichloromethylthio tetrahydrophthalimide which crystallized out was then filtered off. The residue was washed with 300 ml. of chloroform to remove any amine hydrochloride. Recovered 200 g. of white crystalline product from this step. The combined chloroform filtrates were washed with 300 ml. of water to remove amine hydrochloride. The chloroform layer was distilled to ⅕ its volume, cooled and the crystallized product (66 g.) recovered by filtration. The total yield (266 g.) of N-trichloromethylthio tetrahydrophthalimide is 89% of theoretical.

EXAMPLE 2

A sample (A) of the above (Example 1) N-trichloromethylthio tetrahydrophthalimide and a sample (B) prepared according to Example 1 of U. S. 2,553,771 were placed in stoppered bottles for one week. On opening the bottles after this time it was observed that sample B had a very strong acid odor whereas the sample A prepared according to the method of the present invention was essentially odor free.

EXAMPLE 3

In a wheat seed germination test, 10 ml. of distilled water and 125 mg. of samples A and B (as described in Example 2) were placed in petri dishes. Blotter paper was then placed in the dishes and 20 wheat seeds placed on the blotter paper. After standing covered at room temperature for 72 hours the appearance of the seeds were observed. The seeds germinated after being treated with product B had spindly roots and few root hairs. Seeds treated with product A had strong healthy roots and many root hairs similar to an untreated blank.

EXAMPLE 4

*Preparation of N-trichloromethylthio methyl succinimide*

One mole (113 g.) of methyl succinimide and 102 g. of triethyl amine were dissolved in one liter of chloroform in an apparatus as in Example 1. 186 g. of perchloromethyl mercaptan dissolved in 300 ml. of chloroform was added to the stirred solution at 15–20° C. over a period of about 20 minutes. After 15 minutes' additional stirring, 15 g. triethyl amine was added. The chloroform solution was washed twice with water, once with dilute HCl and again with cold water. It was then dried over $Na_2SO_4$, filtered and the chloroform stripped off at a maximum of 70° C. under reduced pressure. Recovered 226 g. of N-trichloromethylthio methyl succinimide.

Analysis:

|  | Percent N | Percent S | Percent Cl |
| --- | --- | --- | --- |
| Found | 5.18 | 12.25 | 40.26 |
| Theory | 5.34 | 12.2 | 40.6 |

EXAMPLE 5

*Preparation of A-trichloromethylthio, 3-methyl hexahydrophthalimide*

The procedure was the same as in Example 4 using 167 g. of 3-methyl hexahydrophthalimide, 102 g. of triethyl amine and 186 g. of perchloromethyl mercaptan. Recovered 316 g. of a light tan viscous oil (100% yield).

Analysis:

|  | Percent N | Percent S | Percent Cl |
| --- | --- | --- | --- |
| Theory | 4.43 | 10.12 | 33.7 |
| Found | 4.08 | 9.86 | 32.7 |

EXAMPLE 6

*Preparation of N-trichloromethylthio, 5-methyl 2,4-thiazolidinedione*

The procedure was the same as Example 4 using 156 g. of 5-methyl, 2,4-thiazolidinedione, 121 g. of triethylamine and 222 g. of perchloromethyl mercaptan. Recovered 323 g. (97% yield) of a light yellow viscous oil.

Analysis:

|  | Percent N | Percent S | Percent Cl |
| --- | --- | --- | --- |
| Theory | 5.00 | 22.8 | 38.0 |
| Found | 4.74 | 23.7 | 36.8 |

It is to be understood that the invention is not to be limited by the specific examples given for the purpose of illustration, and that modifications may be made without departing from the spirit of the invention.

The invention described is claimed as follows:

1. In the process of preparing N-trichloromethylthio derivatives of a nitrogen-containing organic compound by reaction of the nitrogen-containing organic compound with perchloromethyl mercaptan in an inert organic solvent, the improvement which comprises having present in the reaction mixture a tertiary amine in an amount in excess of that required to combine with hydrogen chloride formed by the reaction and sufficient to combine with unreacted perchloromethyl mercaptan present at the end of said reaction to form water-soluble products but insufficient to compete substantially with said nitrogen-containing compound during said reaction for reaction with said perchloromethyl mercaptan, washing with water the resulting reaction solution to remove the water-soluble products present in said solution and recovering the resulting N-trichloromethylthio derivatives of the nitrogen-containing organic compound from the washed solution.

2. A process according to claim 1 in which the nitrogen-containing organic compound is an imide.

3. A process according to claim 1 in which the nitrogen-containing organic compound is an amide.

4. A process according to claim 1 in which the inert organic solvent is chloroform.

5. A process according to claim 1 in which the tertiary amine is triethyl amine.

6. In the process of preparing N-trichloromethylthio derivatives of a nitrogen-containing organic compound by reaction of the nitrogen-containing organic compound with perchloromethyl mercaptan in an inert organic solvent, the improvement which comprises having present in the resulting reaction mixture at the end of said reaction a tertiary amine in an amount sufficient to combine with unreacted perchloromethyl mercaptan to form water-soluble products, separating N-thiochloromethylthio derivatives from the inert organic solvent, washing said derivatives to remove water-soluble products, and washing said inert organic solvent to remove water-soluble products therefrom.

7. In the process of preparing N-trichloromethylthio derivatives of a nitrogen-containing organic compound by reaction of the nitrogen-containing organic compound with perchloromethyl mercaptan in an inert solvent in the presence of a tertiary amine, the improvement which comprises adding to the reaction mixture at the end of said reaction an amount of tertiary amine sufficient to react with unreacted perchloromethyl mercaptan present in said reaction mixture to form water-soluble products, washing the resulting mixture to remove water-soluble products and recovering the N-trichloromethylthio derivatives of the nitrogen-containing organic compound.

References Cited in the file of this patent

UNITED STATES PATENTS

| | | |
|---|---|---|
| 2,672,460 | Conroy | May 16, 1954 |
| 2,713,058 | Kittleson | July 12, 1955 |
| 2,744,118 | Cavalla | May 1, 1956 |

FOREIGN PATENTS

| | | |
|---|---|---|
| 666,636 | Great Britain | Feb. 13, 1952 |

OTHER REFERENCES

Kittleson: Science, vol. 115, pages 84–6 (1952).

Brintzinger et al.: Chem. Ber., vol. 82, pages 389–99 (1949).

Brintzinger et al.: Chem. Ber., vol. 83, pages 87–90 (1950).

MacArdle: "Solvents in Synthetic Org. Chem." (Van Nostrand), pages 1–3 (1925).